(12) United States Patent
Kubota et al.

(10) Patent No.: US 8,293,828 B2
(45) Date of Patent: Oct. 23, 2012

(54) ADHESIVE AND PROCESS FOR ATTACHING AND DETACHING ARTICLES

(75) Inventors: Masanori Kubota, Hockessin, DE (US); Ayako Kubota, Hockessin, DE (US); Munetaka Kubota, Hockessin, DE (US); Takuma Kubota, Hockessin, DE (US)

(73) Assignee: Kubota Research Associates, Inc., Hockessin, DE (US)

( * ) Notice: Subject to any disclaimer, the term of this patent is extended or adjusted under 35 U.S.C. 154(b) by 1033 days.

(21) Appl. No.: 12/015,941

(22) Filed: Jan. 17, 2008

(65) Prior Publication Data

US 2009/0056865 A1   Mar. 5, 2009

Related U.S. Application Data

(63) Continuation-in-part of application No. 11/214,306, filed on Aug. 29, 2005.

(60) Provisional application No. 60/969,750, filed on Sep. 4, 2007.

(51) Int. Cl.
C08K 3/22 (2006.01)

(52) U.S. Cl. .................................... 524/403

(58) Field of Classification Search .......... 524/440, 524/494, 403; 428/295.1, 292.1, 332, 339; 523/300, 137; 156/272.2–275.7; 264/402–404
See application file for complete search history.

(56) References Cited

U.S. PATENT DOCUMENTS

| | | | |
|---|---|---|---|
| 2,857,754 A | | 10/1958 | Reinert |
| 4,219,460 A | * | 8/1980 | Donermeyer et al. ........ 523/220 |
| 4,250,596 A | | 2/1981 | Hara et al. |
| 4,302,492 A | | 11/1981 | Hutter, III |
| 4,338,151 A | | 7/1982 | Hutter, III |
| 4,390,576 A | | 6/1983 | Hutter, III |
| 4,414,339 A | * | 11/1983 | Solc et al. ................. 523/137 |
| 4,421,288 A | | 12/1983 | Blaszkowski |
| 4,433,930 A | | 2/1984 | Cosenza |
| 4,468,426 A | * | 8/1984 | Hatchadoorian et al. ...... 428/213 |
| 4,518,297 A | | 5/1985 | Kraus |
| 4,568,592 A | * | 2/1986 | Kawaguchi et al. .......... 428/107 |
| 4,657,460 A | | 4/1987 | Bien |
| 4,668,546 A | | 5/1987 | Hutter, III |
| 4,695,508 A | * | 9/1987 | Kageyama et al. ........... 442/149 |
| 4,710,539 A | * | 12/1987 | Siadat et al. ................. 525/59 |
| 4,762,864 A | * | 8/1988 | Goel et al. ................... 523/428 |
| 4,822,224 A | | 4/1989 | Carl et al. |
| 4,906,497 A | * | 3/1990 | Hellmann et al. .............. 428/49 |
| 5,378,879 A | * | 1/1995 | Monovoukas ................ 219/634 |
| 5,447,592 A | * | 9/1995 | Berce et al. ................ 156/272.4 |
| 5,712,039 A | * | 1/1998 | Marhevka et al. ............ 428/414 |
| 5,744,228 A | * | 4/1998 | Tingley ..................... 428/292.4 |
| 5,932,298 A | * | 8/1999 | Moon ......................... 427/496 |
| 6,723,786 B2 | | 4/2004 | Husemann et al. |
| 6,816,182 B2 | * | 11/2004 | Kubota et al. ................. 347/258 |
| 6,884,854 B2 | * | 4/2005 | Schoenfeld et al. ........... 525/524 |
| 6,998,011 B2 | * | 2/2006 | Schoenfeld et al. ....... 156/331.4 |
| 2003/0083413 A1 | * | 5/2003 | Stumphauzer ............... 524/296 |
| 2003/0090562 A1 | * | 5/2003 | Kubota et al. ................. 347/241 |
| 2003/0148691 A1 | * | 8/2003 | Pelham et al. ................ 442/347 |
| 2003/0159775 A1 | * | 8/2003 | Tsui et al. .................. 156/272.8 |
| 2003/0187154 A1 | * | 10/2003 | Schoenfeld et al. .......... 525/523 |
| 2003/0196753 A1 | * | 10/2003 | Schoenfeld et al. .......... 156/330 |
| 2004/0026028 A1 | * | 2/2004 | Kirsten et al. .............. 156/272.4 |
| 2004/0099659 A1 | * | 5/2004 | Johnson, Jr. ................. 219/633 |
| 2005/0170164 A1 | * | 8/2005 | Christ et al. ............... 428/292.1 |
| 2006/0079605 A1 | | 4/2006 | Sato et al. ..................... 523/176 |
| 2006/0283543 A1 | * | 12/2006 | Kubota et al. .............. 156/272.2 |
| 2006/0286362 A1 | * | 12/2006 | Kubota ....................... 428/297.4 |
| 2007/0131335 A1 | | 6/2007 | Zhou et al. |
| 2011/0104496 A1 | * | 5/2011 | Cook et al. ................... 428/404 |

* cited by examiner

Primary Examiner — Peter Szekely
(74) Attorney, Agent, or Firm — McCarter & English

(57) ABSTRACT

The present invention relates to using an adhesive and process for heating, curing, joining, attaching and detaching a part article from a body substrate structure. Described are polymeric adhesive compositions and methods of curing using a radiation apparatus for rapid adhesive bonding and attaching a fastener part to a structure surface. The adhesive composition contains additives that directly or indirectly absorb projected radiation from a radiation apparatus to rapidly and uniformly melt the adhesive and bond the surface of the part material onto the surface of the substrate material. A process is also described to reverse the adhesive bonding and detach the fastener part from the substrate.

7 Claims, 9 Drawing Sheets

ADHESIVE AND PROCESS FOR ATTACHING AND DETACHING ARTICLES

CROSS REFERENCE TO RELATED APPLICATIONS

This application claims the benefit of priority under 35 U.S.C. §119(e) to U.S. Provisional Patent Application Ser. No. 60/969,750 filed Sep. 4, 2007; and under 35 U.S.C. §120 to U.S. patent application Ser. No. 11/214,306, filed Aug. 29, 2005, the contents of which are fully incorporated herein by reference in their entirety.

FIELD OF THE INVENTION

Metal, composite and metal composite hybrid parts are attached to metal or composite surfaces in the manufacture of transportation body structures, such as aircraft fuselage or automobile body structures. The present invention relates to adhesive compositions including polymeric adhesives, and radiation apparatus for rapid adhesive bonding and attaching articles, for example, parts to a surface or to each other. A process is also described to reverse the adhesive bonding and detach the parts. In particular, the present invention relates to using an adhesive and process for heating, curing, joining, attaching and detaching an article from a body structure.

BACKGROUND

Aircraft, automobile and other transportation industries are continually seeking methods and materials to reduce weight of body structures in manufacturing. One method of weight reduction is accomplished by replacing heavier metal body panels and structures with lightweight metal or fiber reinforced polymer composite (FRP) panels in construction of body structures. These industries are aggressively perusing the use of FRP composite materials to reduce weight and improve fuel efficiency in aircraft and automobiles. A major issue in using composite and lightweight metal materials for the main body structure is the installation of fasteners and joining of parts onto the body structure during assembly of the aircraft or vehicle. Current methods of attaching fasteners and parts during assembly include using adhesives, mechanical fasteners or welding processes.

Thermoset adhesives, such as epoxy adhesives are commonly used to attach parts to metal or composite structures. These adhesives have short pot life (i.e., working time or usable life) and shelf life, and require long time periods to chemically react to set and cure. The manufacturing industry commonly uses thermoset adhesives with convection heat, hot plate and/or infrared radiation processing to join parts during assembly. One method of joining polymeric parts is by using polymeric adhesives. In this method, a thermoset adhesive is placed between the polymeric parts A and B to be joined. A hot air source is directed at the polymeric parts to heat the parts. The source heats the polymeric parts and polymeric adhesive and the thermoset adhesive is thermally cured by conduction heating.

Heating done by conduction has the limitations of being slow to heat the part and slow to cool off after processing and the heating process cannot be precisely controlled. Aerospace grade epoxy adhesive may take 3 to 7 days at ambient room temperature and 10 to 14 hours in a controlled autoclave system to fully cure. Attaching parts to a composite structure using thermoset adhesives is a time consuming and slow process. Detaching a conventional thermoset adhesive bonded part from the composite or metal structure is an intensive, time consuming task, and risks damaging the surface of the base structure.

Mechanical fasteners such as bolts or screws are attached by first drilling holes into the panel or body structure. Holes drilled into the body may produce stress points and material fatigue, a well-known issue in the industry. This is especially undesirable in composite panel structures where stress may cause composite panel delamination and structural failure over time. Using radiation or convection heat welding to attach parts to a composite substrate raises another issue. Conventional fiber-reinforced composite degrades when exposed to convection heat welding or radiation welding. For example, a fiber reinforced epoxy composite part surface may burn, decompose and/or delaminate when exposed to heat temperatures above 200° C. during the welding process.

Therefore, it is desirable to be able to bond parts onto reinforced polymeric composite and other lightweight substrate surfaces without using mechanical fasteners, welding processes or time-consuming thermoset adhesives in the manufacturing process. It is also desirable to be able to easily remove the parts from the composite structure in a repair process.

SUMMARY

In certain aspects, the invention relates to a polymeric adhesive used in combination with a radiation process to securely but reversibly bond an article, for example, to another article or to a structure surface.

Other aspects, features, and advantages of the present invention will become more fully apparent from the following detailed description of the preferred embodiments, the appended claims, and the accompanying drawings.

DETAILED DESCRIPTION

Figure 1:
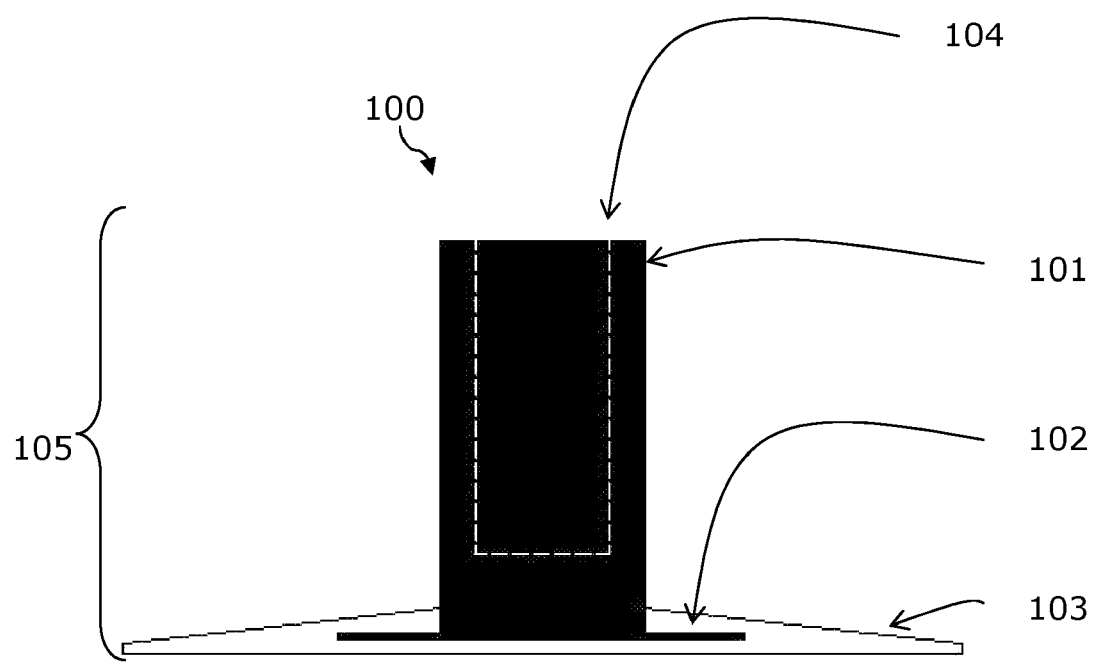
FIG. 1 is a diagram of a metal composite hybrid part.

Presently described are polymeric adhesive compositions used in combination with a radiation process to securely, and reversibly bond an article, for example, to another article or to a structure surface. The article or articles to be attached can be of any suitable material that would be known by those skilled in the art. In certain aspects the article or articles comprises at least one of a metal, a fiber reinforced composite or a metal composite hybrid material or a combination thereof. The structural surface can be of any suitable material that would be known by those of skill in the art. In certain aspects the surface is at least one of a metal or a fiber reinforced composite material.

In certain embodiments, the adhesive polymeric composition is a polymer resin or polymer alloy selected for physical and mechanical properties that optimize bonding of the part to the structural surface. As one of ordinary skill in the art would readily appreciate, the particular choice of polymer adhesive will depend upon a number of factors including the composition of the materials to be bonded and the desired performance specifications. The selection of a suitable adhesive is a matter of routine testing and optimization steps by those of skill in the art in view of the instant teachings. In certain aspects of the invention, the adhesive further comprises uniformly dispersed additives that are at a dosage that partially absorb, transmit, reflect and emit projected radiation. The composition and concentration of the additives in the polymer adhesive are optimized according to the steps described herein so that the adhesive, when irradiated using the process apparatus, will uniformly heat, melt, cure and bond the adhesive to the part and substrate.

In certain additional aspects, the adhesive composition of the invention may also contain a fiber-reinforcement material, such as a short fiber, that is added to the adhesive composition to increase creep resistance in the bond of the part to the structure. Thermo set adhesives and thermoplastic adhesives suffer from a well known disadvantage, that is, creep. As used herein, "creep" is the term used to describe the tendency of a material to move or to deform permanently to relieve stresses. The deformation occurs as a result of long term exposure to levels of stress. Creep is more severe in materials that are subjected to heat for long periods and near melting point. As such, thermoplastic adhesives and thermoset plastic adhesives were, heretofore, considered undesirable for use in aerospace and automotive applications. However, certain embodiments of the instant invention encompass adhesives that substantially ameliorate the problem of creep through the incorporation of fiber-reinforcement materials. The adhesives and methods of the invention also allow for the convenient and relatively fast fixing and repair of adhesive-bonded parts. Therefore, the adhesives and associated methods of use as described herein are the instant invention are suitable for use in aerospace and automotive manufacturing.

In any of the embodiments described herein, the adhesive composition can be in any suitable form known to those of skill in the art. For example, the adhesive can be in the form of a paste that is applied in a thin layer to the base of the part. In certain other embodiments, the adhesive can be applied by co-molding the adhesive onto the base of the part or can be applied by lamination, brushing, spraying, coating or applied by any other manner known to the industry. The adhesive paste is dried as a coating onto the base of the part by exposure to room air or under accelerated drying conditions in an oven.

In additional aspects, the invention relates to methods for heating and melting the polymer adhesives of the invention. In certain embodiments, a radiation unit apparatus is used in combination with the adhesive in a process to heat and melt the adhesive to join the part and substrate. For example, during irradiation, the part is held against the substrate under pressure while the radiation unit apparatus projects radiation focused onto the adhesive layer at the interface between the part and substrate. The adhesive layer partially absorbs, reflects, transmits and emits the radiation to distribute the radiation throughout the three-dimensional adhesive layer and uniformly melts the adhesive layer to bond the part onto the substrate surface.

The adhesive is designed in composition to bond both similar and dissimilar surfaces such as metal, metal composite hybrid and fiber reinforced composite surfaces. The bonding strength of the final bond is sufficient to withstand the load placed onto the part in the fastening and assembly of, for example, aircraft or automobile structures. Moreover, the adhesive and the part attachment process are designed for rapid assembly of structures.

The part that is bonded to the substrate can be detached from the substrate by reversing the process described in this invention. The process used to detach the part from the substrate includes irradiation of adhesive interface layer at the part base to melt the adhesive layer while applying a peeling force. The adhesive melts and the part can be detached. This procedure can be used in manufacturing structures in a repair process.

Additional exemplary embodiments of the present invention are illustrated in the FIGURES, like numerals being used to refer to like and corresponding parts of the various drawings. Obviously, the inventive concept is not meant to be limited to the securing of any particular part or structure nor is it limited to the parts and structures described in the examples. Those of ordinary skill in the art would readily recognize that the compositions and methods of the invention are suitable for use with an unlimited number of parts and/or structures.

Referring now to FIG. 1, the figure shows a part 100 having a metal threaded rod 101 with a flat metal flange base 102. A threaded hole 104 is drilled on the inside of the metal rod 101. The metal flange is imbedded and completely surrounded by a fiber-reinforced polymer composite 103 to form a metal composite hybrid standoff part. The part in this example is commercially available from Click Bond, Inc. and is used as a insulated standoff harness retainer in aircraft construction applications and is normally fastened to a metal or fiber-reinforced composite body surface by using a thermoset epoxy adhesive.

Figure 2:
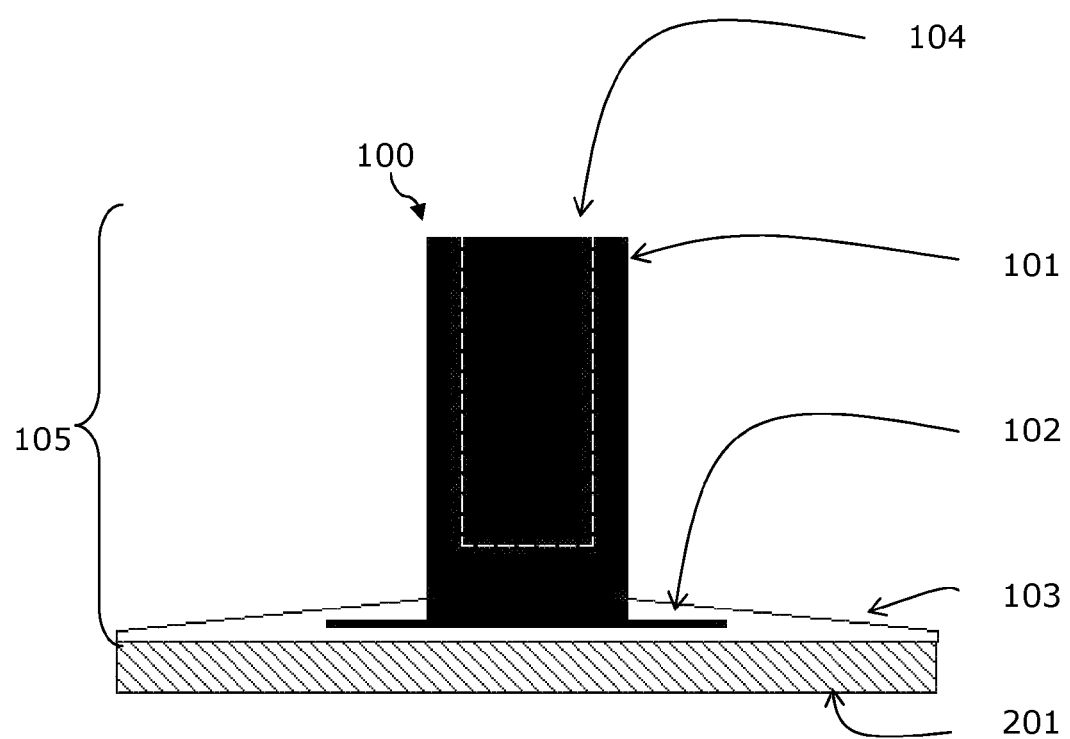
FIG. 2 is a diagram of a metal composite hybrid part with adhesive layer 204.

FIG. 2 shows a polymeric adhesive layer 201 applied to the base of the metal composite hybrid part 105 that was described in FIG. 1. In certain aspects, the adhesive is the form of a paste that is applied in a thin layer to the base of the part. However, the invention is not intended to be limited as such. As contemplated herein, the adhesive can be in any suitable form known to those of skill in the art, for example, a gel, a liquid, a solid, a powder, and the like. In additional aspects the adhesive 201 is applied by co-molding the adhesive onto the base of the part. However, many techniques for applying adhesives are known by those of skill in the art and are contemplated by the present invention. As such, the present invention is not limited to the particular embodiment described herein. For example, the adhesive can also be applied by lamination, brushing, spraying, coating or in any suitable manner known to the industry. The adhesive paste is dried as a film onto the base of the part by exposure to room air or under accelerated drying conditions in an oven. The coating of the dried adhesive on the base of the part is typically 25 to 50 microns thick but not restricted to this dimension and can be less than 25 microns or more than 50 microns.

While the thickness of the adhesive coating may vary depending on any number of variables, for example, the particular parts, structures, use specifications, etc. For example, specific considerations include: the amount of adhesive required to result in a strong bond between the part and the substrate surface; and the amount necessary to provide sufficient polymer adhesive to melt, flow and wet the part and substrate surfaces. However, the adhesive layer should not be too thick or the part bonded to the substrate may suffer from mechanical creep over time; and the adhesive layer must be thin enough to avoid mechanical creep of the fastened part. These considerations represent factors that must be optimized and tested, and are regarded as a matter of routine experimentation by those of ordinary skill in the art, even though in some instances the testing may be relatively extensive.

The adhesive composition contains a base polymer that is chosen for physical, chemical and mechanical properties that maximize the bonding strength to the fiber reinforced composite base of the part and the metal or composite substrate panel or structure of the aircraft or automobile. The polymer process temperature (typically at the melting point +50° C.) and curing temperature must both be higher than the operating temperature environment for the application, for example, aircraft or automobile application. The polymer process temperature and curing temperature must also be less than the decomposition temperature of the composite resin, which is typically less than 200° C. for an epoxy resin based aircraft composite. The percent elongation of the polymer must be sufficient to provide a tough bond that is resist to cracking with aging under environmental use conditions. The physical characteristics of the polymer selected must meet the chemical and environmental exposure requirements for the end product use.

Homo-polymers, co-polymers, polymer alloys and polymer blends can be used as the base polymer for the adhesive. Thermoplastic polymers such as polyimide, polyetherimide, polyamide, thermoplastic polyurethane, polymethylmethacrylate, polyethylenemethylacrylate, polyethylenevinylacetate, co-polyamide, co-polyester, polyethylenemethylacrylate-polymethylmethacrylate alloys and polyethylenevinylacetate-polyvinylacetate blends can be used as the adhesive polymer base. Also, thermoset plastic polymers such as epoxy, vinyl-ester, bismaleimide and cyanoester can be used as the adhesive polymer base.

The polymeric adhesive contains energy labile additives that are uniformly dispersed throughout the polymeric adhesive layer. As used herein, "energy labile" refers to a substance's ability to, at least partially, perform at least one of absorb, reflect, transmit, or emit energy, for example, infrared radiation. In certain of the preferred embodiments, the additive selected for use in the polymeric adhesive is capable of, at least partially, absorbing, reflecting, transmitting, and emitting energy. The additives are added at a controlled dosage at a total concentration that is not opaque to the projected radiation. The purpose of the additives is to modify the radiation energy that is projected onto the adhesive layer. The additives partially absorb, reflect, transmit and emit the near-infrared radiation that is focused on the adhesive layer, resulting in the uniform distribution and absorption of the radiation energy throughout the three-dimensional structure of the polymeric adhesive layer. The uniformly absorbed energy heats and melts the adhesive layer. The melted adhesive layer wets the part and substrate surfaces, cools and strongly bonds the part to the substrate.

In certain embodiments, for example, where the polymeric adhesive contains a thermoset plastic polymer base, the additives in the thermoset adhesive partially absorb, reflect, transmit and emit the near-infrared radiation that is focused on the adhesive layer, resulting in the uniform distribution and absorption of the radiation energy throughout the three-dimensional structure of the polymeric thermoset adhesive layer. The uniformly absorbed energy heats and cures the adhesive layer. The additives greatly accelerate the curing of the thermoset adhesive and the cured thermoset adhesive strongly bonds the part to the substrate.

Additives that work as effective radiation absorbers, reflectors, transmitters and emitters used in the thermoplastic or thermoset adhesive formulation include, metal oxides, metal powders, ceramic oxides, silicone carbide, carbon black, organic and inorganic pigments and blends of these materials. The additive formulation for the adhesive layer typically includes carbon black or silicone carbide as electromagnetic radiation absorbers that absorb broadly across the near-, mid- and far-infrared electromagnetic radiation spectrum, and the formulation also includes one or more of the other additives listed to provide radiation energy absorption, reflection and emission. SiC, $SiO_2$, $Al_2O_3$, $TiO_2$, NiO $Cr_2O_3$ and $Fe_2O_3$ are known far-infrared radiation emission media. Ta, W, Mo, Ni, C, $Ce_2O_3$, and stainless steel are known mid-infrared radiation emission media. These additives can be uniformly dispersed as powders into the polymer to produce a infrared absorbing, transmitting, reflecting and emitting adhesive polymer.

The total concentration range for the combined additives in the polymeric adhesive is from about 0.005% to about 20% by weight of the polymer base. In a preferred embodiment, the total concentration range for the combined additives in the polymeric adhesive is from about 0.05% to 2% by weight of the polymer base. The total concentration range of the additives is at a dosage such that the adhesive large is not opaque to projected radiation. The concentration range of the additives is at a dosage that allows some radiation transmission throughout the adhesive layer. The composition and concentration of the additives in the polymer adhesive are optimized so that the adhesive, when irradiated using the process apparatus, will uniformly heat, melt, cure and bond the adhesive to the part and substrate.

The adhesive composition may also contain a fiber-reinforcement material, such as a short fiber, that is added to the adhesive composition to increase the creep resistance of the part bond to the structure. Fibers that can be used in the adhesive formulation include glass fibers, inorganic fibers, organic fibers, synthetic fibers and natural fibers, for example, vegetable, animal or mineral fibers. The fiber length used can be a short fiber, produced by chopping the fiber or by other known industry methods. By way of example only, short fiber lengths, such as 0.1 to 0.5 mm, can be uniformly blended into the adhesive composition. A fiber concentration of 0% to 75% by weight of the adhesive polymer base greatly increases creep resistance of the adhesive bond of the part to the structure. The addition of short fibers to the adhesive is at a concentration to provide the required creep resistance to meet the structure manufacturing requirements, which obviously, will vary depending on the field of use, for example, for aerospace, automobile and transportation structures.

Figure 3:
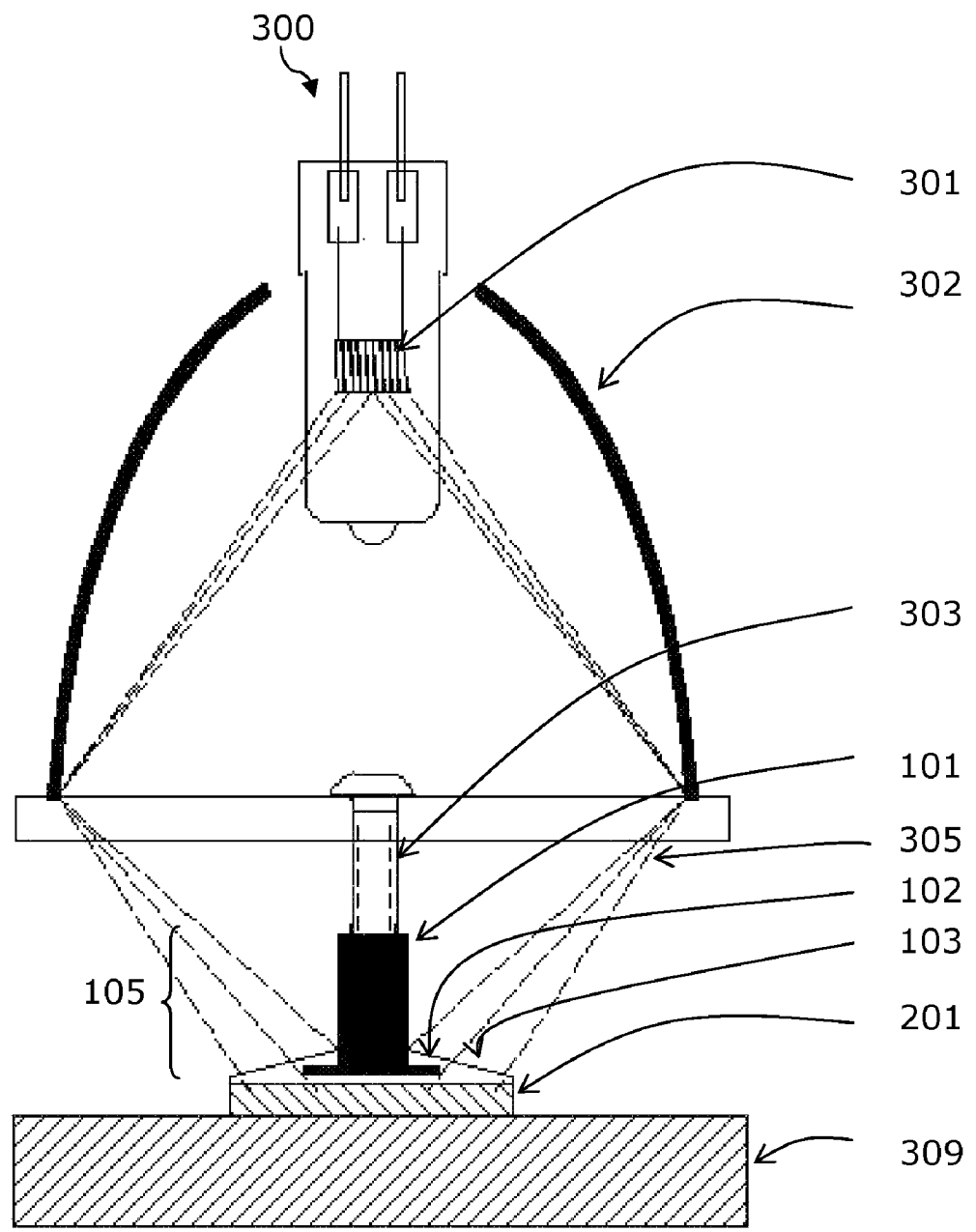
FIG. 3 is a diagram of the process and apparatus for bonding a metal composite hybrid part to a substrate.

FIG. 3 shows an exemplary embodiment of the process of the invention for irradiation of the part 105 to bond the part 105 to the substrate 309. A radiation light source 300 includes a light bulb, having a three dimensional emitter 301 that emits polychromatic electromagnetic radiation that is predominately near-infrared radiation in the 700 nm to 2,000 nm wavelength range. The incident light is directed to a reflector 302 and the reflected incident beam 305 is focused at a three dimensional focal plane and produces a Gaussian beam energy density profile at the plane. The focal plane is aligned to irradiate the composite base 103, metal flange 102 and adhesive layer 201. The position of the emitter 301 to the reflector 302 can be adjusted to control the beam size and the pattern of the energy distribution at the focal plane.

A pressure rod 303, connected to the lamp housing, can be installed as a part of the optical path with minimum optical inhibition at the plane. The part 105 is connected to the radiation unit through the pressure rod 303 that is attached through the threaded stud 101 allowing the application of a constant positive pressure to the part 105 base, the adhesive 201 and the substrate 309 during irradiation. The radiation unit 300 is turned on for a set time period to irradiate the part 105 base and adhesive interface. The radiation unit is held in place applying constant pressure until the adhesive 201 heats, melts and cools to tightly bonds the part to the substrate. The exposure unit with rod is removed after bonding. By way of example, the total time required for bonding a part to a substrate, using a thermoplastic adhesive formulation and a 300 watt emitter radiation source apparatus, is from about 20 to about 40 seconds. This total time includes the irradiation time to heat and melt the adhesive and the cool down time to permanently set the adhesive. It is understood that the adhesive formulation described in this example may contain short chopped fiber to increase the creep resistance of the final part to substrate bond.

Part removal is desirable for repair purposes in manufacturing. The part can be removed by reversing the process described in this invention. The part can be removed or detached by engaging the radiation unit through the rod 303, applying radiation onto the part and heating, softening and melting the thermoplastic adhesive layer 201. When the adhesive layer 201 has heated and melted a negative pressure (peel force) is applied through the rod 303 to remove the part from the substrate surface. The removal procedure can be done rapidly without burning, disturbing or degrading the substrate surface. By way of example, the total time required for removing or detaching a part from a surface is within the range of from about 5 seconds to about 25 seconds, using a with 300 watt emitter radiation source apparatus.

Figure 4:
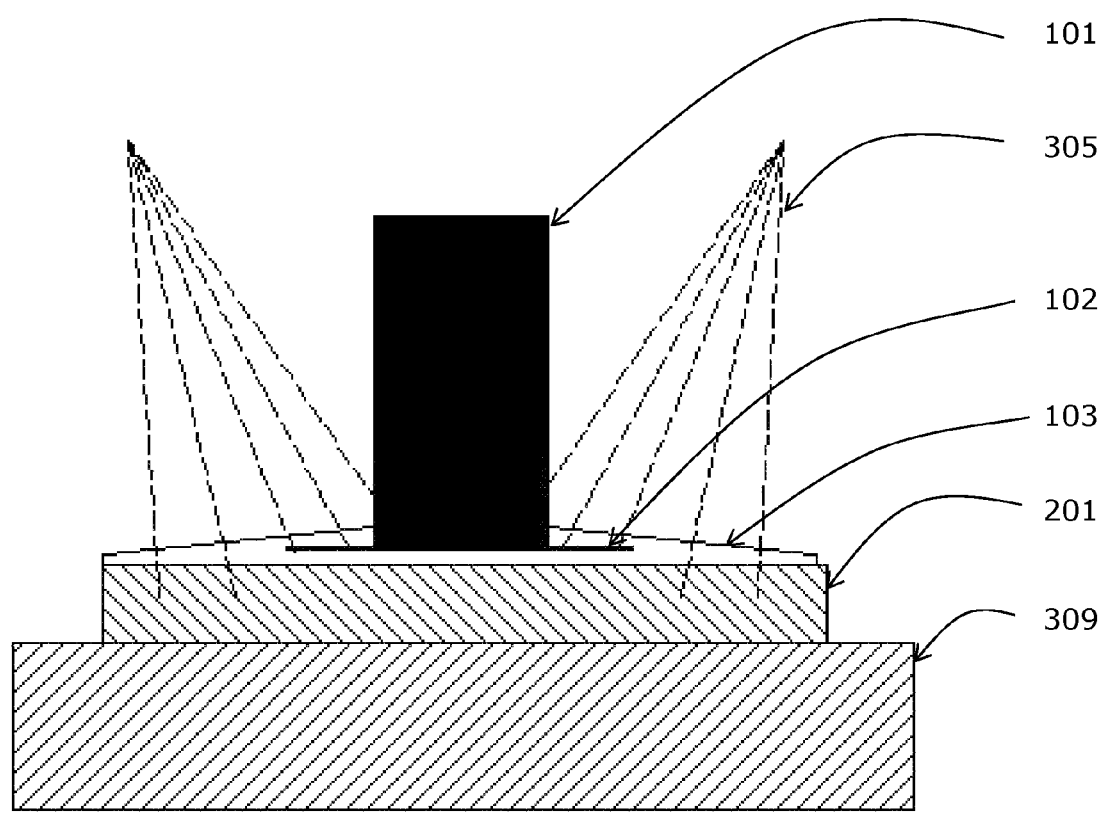
FIG. 4 is a diagram of the irradiation process for bonding a metal composite hybrid part to a substrate.

Details of the irradiation and bonding process for bonding a metal composite hybrid part can be seen in FIG. 4. In this example, the part 105 being joined has a glass fiber reinforced composite base 103 and a metal flange 102 imbedded within the base composite. The energy density from the Gaussian beam 305 passes through the fiber-reinforced base composite 103 that is nearly transparent to the radiation and does not absorb or heat up from the radiation. The radiation is focused by the radiation apparatus onto the focal plane of the adhesive layer 201 where the radiation is absorbed, reflected, transmitted and emitted by the additives in the polymer adhesive layer. The high energy density from the Gaussian beam 305 also irradiates the metal flange 102 imbedded within the composite base 103. The metal flange 102 is opaque to the near-infrared radiation. The near-infrared energy is absorbed by the metal flange 102 and is re-emitted through the base of the metal flange as mid-infrared and far-infrared energy. The re-emitted energy from the metal flange 102 is directed onto the adhesive layer 201 that is under the flange. The additives dispersed throughout the adhesive layer uniformly absorb, transmit, reflect and emit the infrared energy from under the fiber-reinforced base area and under the metal flange area of the part. The adhesive uniformly heats and melts throughout the three-dimensional area of the adhesive layer to bond the metal hybrid composite base to the substrate.

A significant advantage of the present invention is that the concentration of the electromagnetic radiation absorbing additive in the polymer base is adjusted so that the absorption of electromagnetic radiation and conversion of the radiation into heat to melt the polymer base occurs at a similar rate for the polymer adhesive that is directly exposed to the radiation, and the polymer adhesive that is under the metal flange (i.e., not directly exposed to the radiation). Previous adhesives suffered from the disadvantage of uneven heating and undesired latent heating from the thermal energy retaining qualities of the parts, substrates or both being bonded. For example, the exposure of the part to a radiation source results in absorption, and emission of energy by the part itself. This means that the adhesive lying directly behind the part may heat unevenly as compared to regions where the adhesive is exposed directly to the radiation. Because of the higher heat capacity of many metals and alloys, the adhesive underneath may continue to be heated even after the removal of the radiation source. This problem can lead to problems such as uneven setting of the adhesive, and cooking of the adhesive. The end result of these problems can be a reduction in the strength or structural integrity of the bond.

Further to this point, and with reference to FIG. 1, the energy labile additives of the adhesive formulation of the instant invention ameliorate these undesirable effects surprisingly and unexpectedly. For example, due to the presence of the energy labile additives, the metal flange 102 absorption and re-emission of the electromagnetic radiation, which is absorbed by the polymer under the flange and converted into heat by the polymer under the flange, occurs at a similar rate as the absorption, heating and melting of the polymer base that is directly exposed to the radiation. Thus, the adhesive of the instant invention provides for a more uniform melting and bonding of the entire polymer base to the substrate.

The formulation of the adhesive and the construction of the radiation apparatus are optimized via routine testing to produce a uniform bonding across and throughout the adhesive layer. Non-uniform bonding under the metal flange will occur if, as shown in Example 3, below, the adhesive layer does not contain additives that efficiently absorb, transmit, reflect and emit the radiation projected onto the part base and the adhesive layer.

Figure 5:
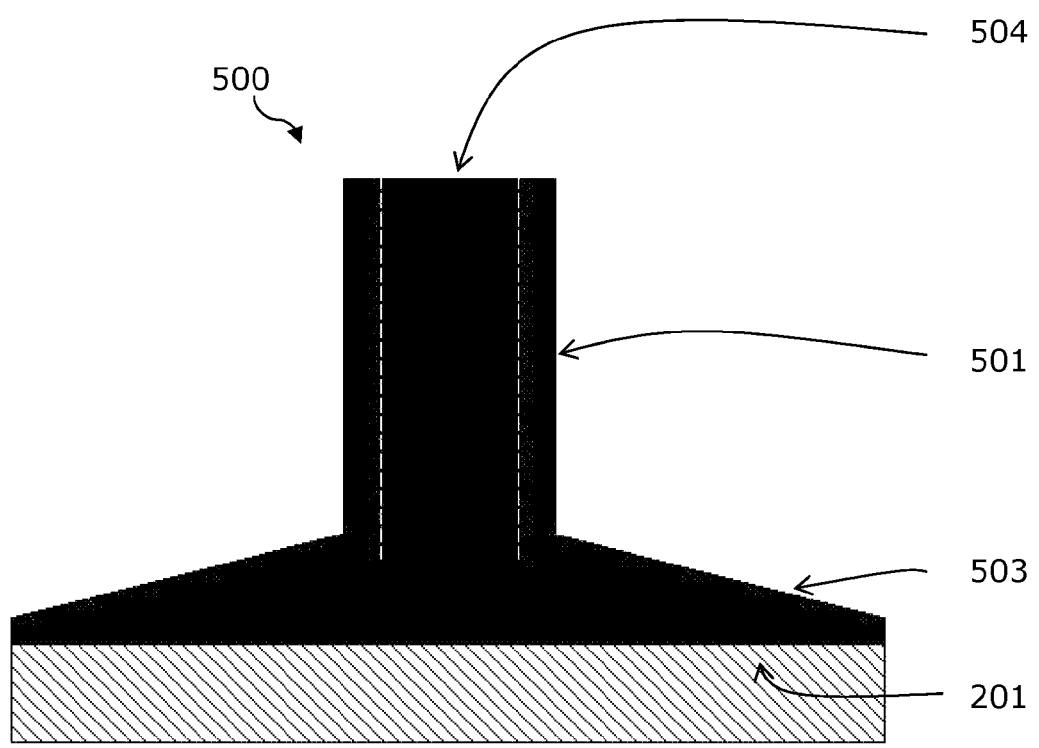
FIG. 5 is a diagram of a metal or composite part with adhesive layer.

FIG. 5 shows yet another exemplary part 500 configuration. In this configuration, the entire part 500 is made from metal. Alternatively, the entire part 500 could be made from a fiber-reinforced composite material. The part is made having a threaded rod 501 with a flat flange base 502 of the same material composition. A threaded hole 504 is drilled on the inside of the rod 501. A polymeric adhesive 201 is applied in a thin layer to the base of the part. As described above, the adhesive can be applied in any suitable form, for example, a paste. In addition, the adhesive coating is applied to a suitable thickness, and dried to a film coating onto the base of the part 500 shown in FIG. 5, according to the procedures and specifications as described previously in this document. As described above, the adhesive comprises a polymer, an additive and a fiber.

Figure 6:
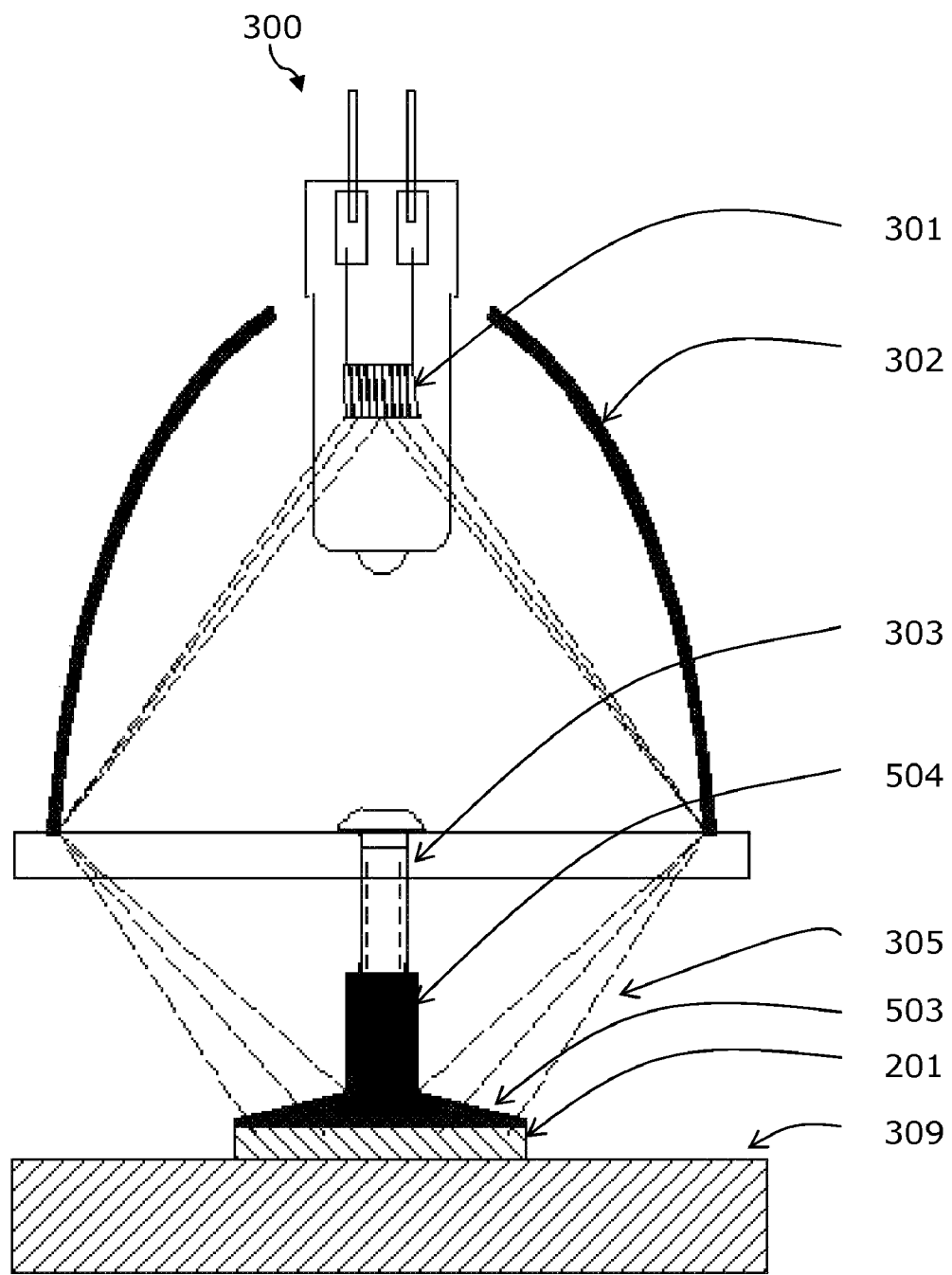
FIG. 6 is a diagram of the process and apparatus for bonding a metal or composite part to a substrate.

FIG. 6 demonstrates another exemplary embodiment of the process of the invention, for example, irradiation of the part in FIG. 5 to bond the part 500 to the substrate 309 where the entire part is made from a metal or from a fiber-reinforced composite material. A radiation light source 300 includes a light bulb, having a three dimensional emitter 301 that emits polychromatic electromagnetic radiation that is predominately near-infrared radiation in the 700 nm to 2,000 nm wavelength range. The incident light is directed to a reflector 302 and the reflected incident beam 305 is focused at a three dimensional focal plane and produces a Gaussian beam energy density profile at the plane. The focal plane is aligned to irradiate the metal or composite base 506 and the adhesive layer 201. The position of the emitter 301 to the reflector 302 is adjusted to control the beam size and the pattern of the energy distribution at the focal plane.

A pressure rod 303, connected to the lamp housing, is installed as a part of the optical path with minimum optical inhibition at the plane. The part is connected to the radiation unit through the pressure rod 303 that is attached through the threaded stud 504 allowing the application of a constant positive pressure to the part base 503, the adhesive 201 and the substrate 309 during irradiation. The radiation unit is turned on for a set time period to irradiate the part base and adhesive interface. The radiation unit is held in place applying constant pressure until the adhesive 201 heats, melts and cools to tightly bonds the part to the substrate. The exposure unit with rod is removed after bonding. In accordance with the process of the invention, the total time required for bonding a part to a substrate, using a thermoplastic adhesive formulation and a 300 watt emitter radiation source apparatus, is from about 20 seconds to about 40 seconds. This total time includes the irradiation time to heat and melt the adhesive and the cool down time to permanently set the adhesive. It is understood that the adhesive formulation described in this example may contain short chopped fiber to increase the creep resistance of the final part to substrate bond.

Part removal is desirable for repair purposes in manufacturing. The part 500 can be removed by reversing the process described in this invention. The part can be removed or detached by engaging the radiation unit through the rod 303, applying radiation onto the part and heating, softening and melting the thermoplastic adhesive layer 201. When the adhesive layer 201 has heated and melted a negative pressure (peel force) is applied through the rod 303 to remove the part 500 from the substrate 309 surface. The removal procedure can be done rapidly without burning, disturbing or degrading the substrate surface. In accordance with the process of the invention, the total time required for removing or detaching a part from a surface is from about 5 seconds to about 25 seconds, using a with 300 watt emitter radiation source apparatus.

Figure 7:
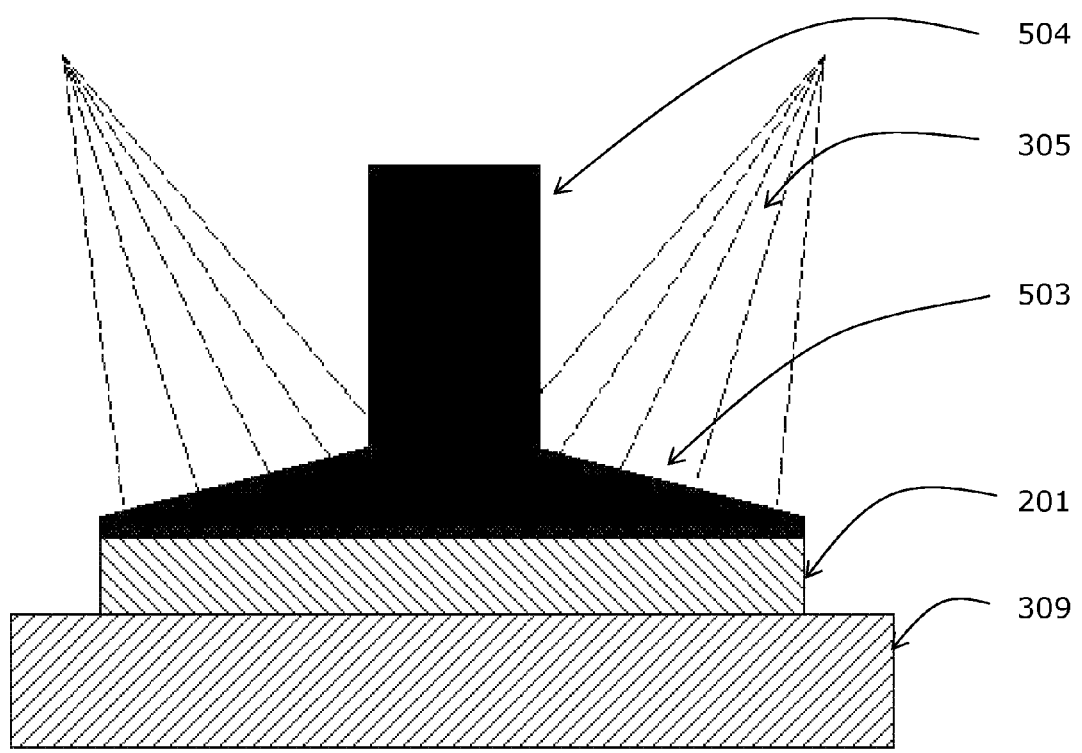
FIG. 7 is a diagram of the irradiation process for bonding a metal part to a substrate.

Details of the irradiation and bonding process for the metal part that is described in FIG. 5 can be seen in FIG. 7. The following example describes the bonding of a part made of metal to a metal or composite substrate. The part being joined has a metal rod 504 attached to a metal flange base 503 both made from the same metal composition. The energy density from the Gaussian beam 305 is focused onto the metal flange base 503 that is opaque to infrared radiation. The near-infrared energy is absorbed by the metal flange and is re-emitted through the base of the metal flange as mid-infrared and far-infrared energy. The re-emitted energy from the metal flange is focused on the adhesive layer 201 that is under the flange. The additives dispersed throughout the adhesive layer 201 uniformly absorb, transmit, reflect and emit the infrared energy. The adhesive uniformly heats and melts throughout the three-dimensional area of the adhesive layer to bond the metal base 503 to the substrate 309. In a preferred embodiment, the adhesive formulation described in this example may contain short chopped fiber to increase the creep resistance of the final part to substrate bond.

Figure 8:
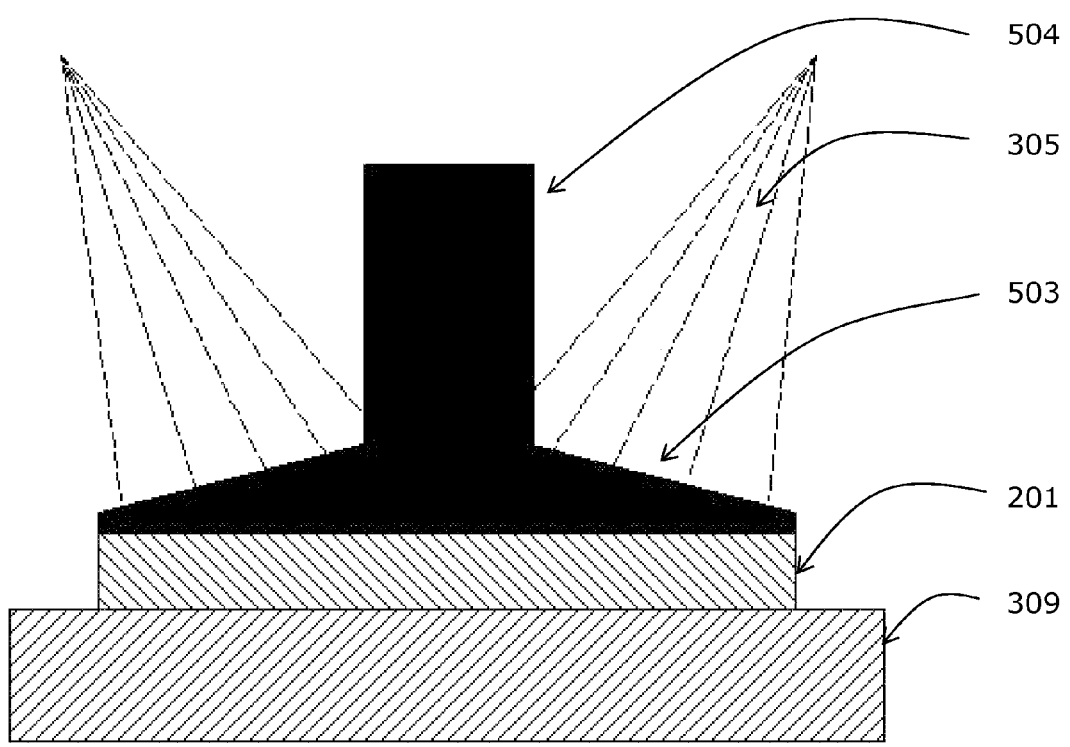
FIG. 8 is a diagram of the irradiation process for bonding a composite part to a substrate.

Details of the irradiation and bonding process for the fiber-reinforced composite (FRP) part that is described in FIG. 5 can be seen in FIG. 8. The following exemplary description is for bonding a part made of fiber-reinforced composite FRP to a metal or composite substrate. The part being joined has a FRP rod 801 attached to a FRP flange base 803 both made from the same FRP composition. The energy density from the Gaussian beam 305 is focused through the FRP base 803 and onto the adhesive layer 201. The FRP base 803 is mostly transparent to the near-infrared radiation and the additives in the adhesive layer 804 absorb the near-infrared energy. The additives dispersed throughout the adhesive layer 201 uniformly absorb, transmit, reflect and emit the infrared energy under the FRP part. The adhesive uniformly heats and melts throughout the three-dimensional area of the adhesive layer to bond the FRP base 803 to the substrate 309. In another of the preferred embodiments, the adhesive formulation described in this example may contain short chopped fiber to increase the creep resistance of the final part to substrate bond.

Figure 9:
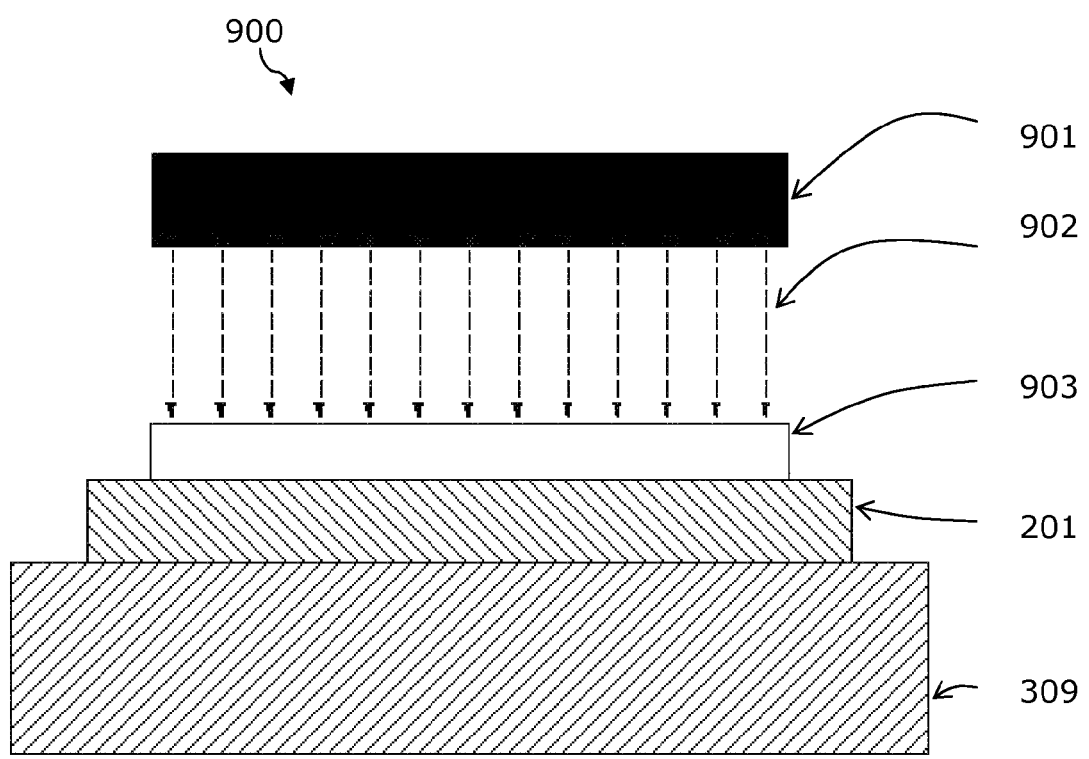
FIG. 9 is a diagram of an alternative part configuration and an irradiation process for bonding a metal foil or sheet to a substrate.

FIG. 9 shows still another exemplary embodiment demonstrating an alternative part configuration and irradiation process of the invention. In this configuration, the entire part 900 is made from a metal that is in the physical form of a foil or sheet 903. In certain aspects, the part comprises a foil, the foil can have a thickness of, for example, from about 25 microns to about 50 microns. In certain other aspects, the part comprises a metal sheet. The sheet can have a thickness of greater than at least about 50 microns. In certain embodiments, the sheet has a thickness of from about 100 microns to about 200 microns. The foil or sheet can have any width dimension such as from several millimeters to several meters wide and can have any length dimension such as a foil that is supplied in a roll form. As seen in FIG. 9, the foil or sheet is coated with a thin layer of polymeric adhesive 201. As previously described, the adhesive can be in any suitable form, for example, a paste that is coated in a thin layer onto the metal foil or sheet, for example by using a film coating process. The adhesive is applied at a thickness and dried to a film coating onto the foil or sheet according to the procedures and specifications as described previously. As described above, the adhesive comprises a combination of a polymer, an additive, and a fiber.

Details of the irradiation and bonding process for the metal foil or sheet can be seen in FIG. 9. The following description is for bonding a metal foil or sheet coated with an adhesive onto a metal or composite substrate. The metal foil or sheet 903 being joined has an adhesive layer coated on one side 201. A radiation source 901 projects an energy density from the Gaussian beam 902 that is focused onto the metal foil or sheet 903 that is opaque to infrared radiation. The near-infrared energy is absorbed by the metal foil or sheet and is re-emitted through the base of the metal foil or sheet as mid-infrared and far-infrared energy. The re-emitted energy from the metal foil or sheet is focused on the adhesive layer 201 that is under the foil or sheet. The additives dispersed throughout the adhesive layer 201 uniformly absorb, transmit, reflect and emit the infrared energy. The adhesive uniformly heats and melts throughout the three-dimensional area of the adhesive layer to bond the metal foil or sheet 903 onto the substrate 309. In any of the embodiments described herein, the substrate can be, by way of nonlimiting example, a fiber-reinforced composite or a metal composition. In certain embodiments the adhesive formulation further comprises a short chopped fiber to increase the creep resistance of the final part to substrate bond.

One example of the application of the materials and process described in FIG. 9 is in the manufacture of an aircraft structure where a thin metal foil, such as 903 is attached to the composite body structure of the aircraft, using the process described in FIG. 9, for the purpose of assembly of a Faraday cage to make the aircraft surface structure electrically conductive and protect the aircraft from electrical lightening strikes.

Examples of adhesive formulations and processes for bonding a part to the substrate are given here to further elucidate the commercial application, value and advantage of this invention. Although the present invention has been described in detail, it should be understood that various changes, substitutions and alterations can be made hereto without departing from the spirit and scope of the invention as defined by the appended claims.

EXAMPLE 1

Attachment of Metal Composite Hybrid Part to a Carbon Fiber Epoxy Resin Composite Plate Using a Common Thermoset Adhesive and Bonding Process In this example, a metal composite hybrid part having the configuration shown in FIG. 1 and available from Click Bond, Inc. was adhesively bonded onto a carbon fiber epoxy resin composite plate using a thermoset epoxy adhesive. An epoxy adhesive was applied to the flat base of the part following the directions supplied by Click Bond, Inc. The part was placed onto a flat carbon epoxy composite plate.

A toughened carbon epoxy composite plate was made using Toray Industry aerospace grade T800 prepreg applied as 24 plies in a (0° 45° 90° −45°) repeat configuration. The composite plate was consolidated using the manufacturers curing cycle recommendation in an autoclave. The final plate was cut into 3"×3" format pieces that were about 1/8" thick.

The glass epoxy base of the Click Bond part and the carbon epoxy composite substrate plate were sanded and pre-treated according to the directions supplied by Click Bond, Inc. The part was attached to the substrate by applying light pressure and using the supplied fixture for holding the part in place while the epoxy adhesive set and dried. The bonded unit was allowed to sit at room temperature and humidity to allow the adhesive to set and dry. The adhesive set for handling purposes after 3 hours. The adhesive completely reacted and dried after 4 days.

EXAMPLE 2

Attachment of a Metal Composite Hybrid Part to a Carbon Fiber Epoxy Resin Plate Using an Exemplary Adhesive and Process of the Present Invention In this example, a metal composite hybrid part having the configuration shown in FIG. 1 and available from Click Bond, Inc. was adhesively bonded onto a carbon fiber epoxy resin composite plate using an exemplary adhesive formulation and bonding process of the present invention.

The adhesive formulation was made by uniformly dispersing about 0.5% by weight of carbon black and about 0.5% by weight of titanium dioxide (by weight of the polymer base) into a thermoplastic polyurethane dispersion, supplied by Sanyo Chemical Industries. About 20% by weight of the polymer base Vectran® TH1670 polyarylate short chopped fiber (0.5 mm) from Kuraray Co., Ltd., was blended uniformly into the dispersion. The adhesive was hand brushed onto the glass fiber-reinforced base of the part and dried in an oven at about 60° C. for about 30 minutes.

A toughened carbon epoxy composite plate was made using Toray Industry aerospace grade T800 unidirectional prepreg applied as 24 plies in a (0° 45° 90° −45°) repeat configuration. The composite plate was consolidated using the manufacturers curing cycle recommendation in an autoclave. The final plate was cut into 3"×3" format pieces that were about 1/8" thick. The carbon epoxy composite substrate plate and glass epoxy base plate of the Click Bond standoff part were sanded and pre-treated according to the directions supplied by Click Bond, Inc.

The part was placed onto a flat carbon epoxy composite plate. A P-Wave™ 300H radiation unit, manufactured by Kubota Research Associates, Inc. and configured as shown in FIG. 3, was placed onto the part by placing the attached threaded rod 303 into the threaded hole in the part 101. The weight of the P-Wave™ unit, approximately 2 kg, was used to apply pressure onto the part and the exposure unit was turned on. The adhesive at the interface between the part and composite substrate was irradiated for about 7 seconds. The radiation unit was held in place, for approximately 10 seconds, until the melted adhesive cooled.

After the radiation unit was removed, the bonded part was pulled up using a pliers and the part was observed to be securely fastened to the composite substrate plate. The part was removed by prying the part off the composite base. The part to substrate bond broke in the composite plate, causing cohesive delamination of the composite plate surface. The adhesive did melt uniformly across the base of the part under both the FRP and the metal flange areas.

EXAMPLE 3

Attachment of a Metal Composite Hybrid Part to a Carbon Fiber Epoxy Resin Plate Using Another Exemplary Adhesive Formulation and Process of the Invention In this example, a metal composite hybrid part having the configuration shown in FIG. 1 and available from Click Bond, Inc. was adhesively bonded onto a carbon fiber epoxy resin composite plate using an adhesive formulation and bonding process described in this invention.

The adhesive formulation was made by uniformly dispersing about 0.5% by weight of carbon black (by weight of the polymer base) into a thermoplastic polyurethane dispersion, supplied by Sanyo Chemical Industries. No titanium dioxide or other additive was used in the formulation. About 20% by weight of the polymer base Vectran® TH1670 polyarylate short chopped fiber (0.5 mm) from Kuraray Co., Ltd., was blended uniformly into the dispersion. The adhesive was hand brushed onto the glass fiber-reinforced base of the part and dried in an oven at about 60° C. for about 30 minutes.

A toughened carbon epoxy composite plate was made using Toray Industry aerospace grade T800 unidirectional prepreg applied as 24 plies in a (0° 45° 90° −45°) repeat configuration. The composite plate was consolidated using the manufacturers curing cycle recommendation in an autoclave. The final plate was cut into 3"×3" format pieces that were about 1/8" thick. The carbon epoxy composite substrate plate and glass epoxy base plate of the Click Bond standoff part were sanded and pre-treated according to the directions supplied by Click Bond, Inc.

The part was placed onto a flat carbon epoxy composite plate. A P-Wave™ 300H radiation unit, manufactured by Kubota Research Associates, Inc. and configured as shown in FIG. 3, was placed onto the part by placing the attached threaded rod 303 into the threaded hole in the part 101. The weight of the P-Wave™ unit, approximately 2 kg, was used to apply pressure onto the part and the exposure unit was turned on. The adhesive at the interface between the part and composite substrate was irradiated for about 7 seconds. The radiation unit was held in place, for approximately 10 seconds, until the melted adhesive cooled.

After the radiation unit was removed, the bonded part was lifted up using a pliers and the part was shown to be securely fastened to the composite substrate plate. The part was removed by prying the part off the composite base. The part to substrate bond broke in the adhesive layer at the composite plate interface. The adhesive was melted under the FRP areas and not melted uniformly under the metal flange area. The adhesive did not melt uniformly across the base of the part.

Comparison of Example 1 to Example 2 Results:

Adhesive bonding of a metal composite hybrid part to a composite substrate can be accomplished in less than about 30 seconds, compared to a thermoset adhesive process now in use that takes 3 hours to several days. The compositions and methods of the invention can greatly reduce the preparation and bonding time required to apply parts to composite body parts in the aerospace and automobile manufacturing process.

Comparison of Example 2 to Example 3 Results:

Uniform adhesive bonding of a metal composite hybrid part to a composite substrate can be accomplished in less than about 30 seconds. Using two different additives optimized the uniformity of the bonding between the part base and the composite substrate. The titanium dioxide added to Example 2 provided additional absorption, reflection and emission of infrared radiation to uniformly distribute infrared radiation throughout the adhesive layer and provide uniform melting and bonding in both the metal and FRP areas of the part.

EXAMPLE 4

Lap Shear and 90° Peel Strength Testing Results from Bonding Carbon Fiber Epoxy Resin Plates Using an Exemplary Adhesive Formula of the Invention Compared to a Benchmark Conventional Thermoset Epoxy Adhesive.

The bonded parts were evaluated for lap shear strength and 90° peel strength using ASTM standard testing procedures ASTM D 3167-03a for 90° peel strength and ASTM D 1002-05 for lap shear strength.

A toughened carbon epoxy composite plate was made using Toray Industry aerospace grade T800 unidirectional prepreg applied as 24 plies in a (0° 45° 90° −45°) repeat configuration. The composite plate was consolidated using the manufacturers curing cycle recommendation in an autoclave. The final plate was cut into strips at the dimensions specified in the ASTM testing procedures.

A single ply of the carbon epoxy composite plate was prepared using the same procedure. A common thermoset epoxy adhesive and an exemplary thermoplastic adhesive formula of the present invention were applied to the interface of the single ply and composite plate. The interface was heated in an oven while held at about 14 psi pressure.

TABLE 1

| Example | Avg. Shear Strength (MPa) | Ave. Peel Strength (kN/m) | Temperature and Dwell Time |
| --- | --- | --- | --- |
| 1. FM300K Epoxy Adhesive | 17.4 | 0.507 | 152° C. at 1.2° C./min heating and cooling rate, total time: 9 hours |
| 2. Polyamide Alloy Adhesive | 20.6 | 0.648 | 185° C. heat, melt, cool, total time: 30 seconds |

The results are shown in Table 1. The thermoplastic adhesive of the instant invention has an equivalent or stronger mechanical performance than the traditional epoxy adhesive bond. However, the processing time for the thermoplastic adhesive of the present invention is less than a minute versus the 9 hour cure time for the traditional epoxy adhesive.

It is understood that the invention is not limited to the exact construction and method steps illustrated and described above, but that various changes and modifications may be made without departing from the spirit and scope of the invention as defined in the following claims.

What is claimed is:

1. An adhesive formulation comprising a thermoplastic adhesive polymer base and an energy labile additive, wherein the energy labile additive comprises carbon black and $Ce_2O_3$, and wherein the total amount of energy labile additives in the formulation comprise from about 0.05% to about 2% by weight of the thermoplastic adhesive polymer base.

2. The adhesive formulation of claim 1, further comprising a fiber-reinforcement material.

3. The adhesive formulation of claim 1, wherein the thermoplastic adhesive polymer base comprises at least one member selected from the group consisting of polyimide, polyetherimide, polyamide, thermoplastic polyurethane, polymethylmethacrylate, polyethylenemethylacrylate, polyethylenevinylacetate, co-polyamide, co-polyester, polyethylenemethylacrylate-polymethylmethacrylate alloys, and polyethylenevinylacetate-polyvinylacetate blends.

4. The adhesive formulation of claim 2, wherein the fiber-reinforcement material comprises at least one of a glass fiber, inorganic fiber, organic fiber, synthetic fiber or a natural fiber.

5. The adhesive formulation of claim 4, wherein the fiber-reinforcement material is from about 0.1 mm to about 0.5 mm in length, and wherein the fiber is substantially uniformly blended into the adhesive composition.

6. The adhesive formulation of claim 4, wherein the fiber-reinforcement material concentration is less than about 75% by weight of the thermoplastic adhesive polymer base.

7. The adhesive formulation of claim 1, wherein the adhesive is in the form of at least one of a paste, a gel, a liquid, a solid or a powder.

* * * * *